United States Patent Office 3,766,151
Patented Oct. 16, 1973

3,766,151
NOVEL TERPOLYMER CONTAINING STYRENE, ACRYLONITRILE AND ANOTHER ACRYLIC MATERIAL
Denis K. Huang, Laurel, Md., assignor to Westvaco Corporation, New York, N.Y.
No Drawing. Original application Oct. 29, 1970, Ser. No. 843,240, now Patent No. 3,595,823. Divided and this application Jan. 13, 1971, Ser. No. 106,233
Int. Cl. C08f 15/40
U.S. Cl. 260—80.73                                    2 Claims

ABSTRACT OF THE DISCLOSURE

A terpolymer comprising a major amount of styrene, and minor amounts of acrylonitrile and another acrylic material such as acrylamide, acrylic acid or methacrylic acid is disclosed, which has utility as an organic pigment in paper coating compositions. A stable aqueous emulsion of the terpolymer is prepared without the need for conventional protective colloids by the proper choice of emulsifiers and temperature during an emulsion polymerization process. The average particle size of the terpolymers produced ranges from about 0.1 to about 0.2 micron.

BRIEF SUMMARY OF THE INVENTION

This application is a division of the copending application Ser. No. 843,240, filed July 18, 1969, now U.S. Pat. No. 3,595,823.

This invention relates to a novel terpolymer, to methods of preparing stable emulsions thereof, and to coating compositions containing the same. The terpolymer comprises styrene as the major constituent, and acrylonitrile and an acrylic material such as acrylamide, acrylic acid, or methacrylic acid, as minor constituents. The new terpolymer finds great utility as a pigment in such things as paper coating compositions.

Polystyrene latices have been used for some time in floor polishes and paint. In general, such non-film forming latices do not find use in paper coating compositions because of poor pigment binding properties. Butadiene-styrene, polyvinyl acetate, acrylic latices and the like have been used in paper coating compositions as film-forming binders, but these latices, in conventional paper coating applications, have been found to be rather inadequate in providing the gloss and printability that the ever-increasing packaging and printing standards demand.

According to the present invention, an economical non-film forming organic terpolymer, comprising styrene as the major ingredient, can be prepared in the form of a stable aqueous emulsion. The terpolymer is useful, for example, as an organic pigment in coating compositions. The novel terpolymer provides excellent gloss and ink holdout when used in printability paper coating compositions as a coating pigment. Conventional paper coating binders can be used to bind the new organic pigment to the substrate. For example, the binder can be starch, protein such as casein and alpha protein, or a synthetic binder such as polyvinyl acetate, polyacrylates, and styrene-butadiene. In paper coatings according to the present invention, the binder makes up a minor amount of the coating composition, and the pigmentary component makes up the major portion of the coating composition. With increasing amounts of the terpolymer in a coating composition, the gloss level and printing quality of the final dried coating increases.

The new terpolymer can be prepared as an aqueous emulsion and added in that form directly to other ingredients of a paper coating composition. It can be used as the only pigmentary component of the coating composition or it can be used with conventional coating pigments, such as clay and titanium dioxide. In either case, the total pigment content in the coating formulation is larger than the content of the paper coating binder.

The terpolymers of this invention comprise, by weight, at least about 70% styrene, with the remaining 30% comprised of acrylonitrile and another acrylic material. While styrene is believed to be the primary gloss-developing component of the terpolymers, the unique properties of stability and high gloss, as compared to conventional poly-styrene homopolymers, are the result of the novel combination of the three monomers making up the terpolymers. Preferably, the terpolymers comprise, by weight, about 70 to 90% styrene monomer, about 8 to 25% acrylonitrile, and about 0.5 to 5% of a material selected from the group consisting of acrylamide, acrylic acid, and methacrylic acid. In the preferred embodiments of the invention, acrylamide is used.

The preferred method of preparing one of the novel terpolymers is to prepare it as an aqueous emulsion by emulsion polymerization. In making latex emulsion conventionally, protective colloids, such as gum Arabic, carboxymethylcellulose, casein, alpha protein, and polyvinyl alcohol, are used to provide chemical and mechanical stability to the latex emulsion. Without their use, a latex emulsion would tend to gel under end-use conditions, as may occur when used in paper coating compositions. Additionally, anti-freeze compounds are added to the emulsion to provide freeze-thaw stability. I have found, however, that a stable emulsion of the novel terpolymer can be prepared without use of conventional protective colloids and anti-freeze compounds by proper choice of emulsifiers and temperature during the emulsion polymerization. In this connection, primary emulsifiers, those used during the polymerization, are employed. The preferred primary emulsifiers are a mixture of anionic and non-ionic compounds, the ratio of anionic to non-ionic being about 1:1 to 2:1. Below this ratio, the latex tends to be unstable because the particle size of the terpolymer becomes too large. Above this ratio, the particle size of the terpolymer becomes too small for optimum mechanical stability and for optimum gloss-producing ability in paper coatings. The preferred non-ionic primary emulsifiers are alkyl aryl polyoxyethylene ethanols having about 10 to 70 ethylene oxide units, used in an amount of about 1.0 to 3.0% of the total weight of monomers. For example, such non-ionic emulsifiers are octyl phenoxy ethanol having about 40 ethylene oxide groups, nonyl phenoxyethylene ethanol having about 30 ethylene oxide groups, and isooctyl phenyl polyoxyethylene ethanol.

The preferred anionic emulsifiers are used in an amount of about 1.5 to 5.0% of the total weight of monomers and are selected from the group consisting of alkyl aryl sulfonates, such as for example sodium dodecyl benzene sulfonate, and triethanolamine dodecyl benzene sulfonate; alkyl aryl polyoxyethylene sulfates, such as for example the well-known, commercially available compounds sold under the trade names Triton W–30, Triton X–301, and Triton 770; and alkyl aryl polyoxyethylene sulfonates, such as for example sodium octyl benzylpolyoxyethylene sulfonate (Triton X–200 or Triton X–202).

If the terpolymer is to be used as an organic pigment in paper coating compositions, the use of secondary emulsifiers, those used after the polymerization reaction is completed, is desirable. It has been found that multi-valent ions commonly found as impurities in conventional coating clays tend to gel a latex emulsion. To this end and to provide the terpolymer emulsions of this invention with chemical stability, secondary emulsifiers are added to the products of the emulsion polymerization reaction when the end-use of the terpolymer is as a coating pigment. The preferred secondary emulsifiers are again a mixture of anionic and non-ionic compounds. The preferred non-ionic secondary emulsifiers are selected from alkyl aryl polyoxyethylene ethanols having about 10 to 70 ethylene oxide groups, such as for example those set forth above in connection with the non-ionic primary emulsifiers. The preferred anionic secondary emulsifiers are selected from alkyl aryl polyoxyethylene sulfonates, such as for example those set forth above in connection with the anionic primary emulsifiers. The anionic emulsifier is added in an amount varying from about 0.8 to 2.0% by weight of the total amount of monomers. The non-ionic emulsifier is added in an amount varying from about 1.0 to 5.0 parts by weight of the total amount of monomers. The ratio of anionic to non-ionic compound is not critical in connection with the secondary emulsifiers. It is preferred, however, that the overall ratio of anionic to non-ionic compounds used as primary and secondary emulsifiers range from about 1 to 0.85 to about 1 to 1.2 to insure chemical stability of the terpolymer emulsion when used in paper coating compositions.

To prepare an aqueous emulsion of the new terpolymer, a reactor is first charged with water and the temperature is raised to reaction temperature of about 65° to 70° C. The use of an accelerator is optional and if one is used, it is preferably charged with the water. Such materials are well-known in the art and may be, for example, sodium bisulfite, sodium thiosulfate, sodium metabisulfite, or sodium bicarbonate. A nitrogen blanket is introduced. Then, with constant agitation, the primary emulsifiers and reaction catalyst are added as one mixture simultaneously with a separate mixture of the three monomers. These additions are preferably made at a constant ratio of the mixture of the monomers to the emulsifier-catalyst mixture in order to insure uniform particle size of the resulting terpolymers. When the addition of these ingredients is completed, additional catalyst may be added, and the reaction mixture is maintained at about 80° to 95° C. for about one hour to complete the reaction. The use of an addition catalyst is optional and may be used to insure that all monomers have reacted, in order to avoid any odor attendant with unreacted monomer. In an end-use where odor is no problem, an addition catalyst is unnecessary since the yields of terpolymer are quite high.

If secondary emulsifiers are used, they may be added to the reaction vessel immediately before the temperature of the reaction is raised to 80° to 95° C. or they may be added after this heating period. The preferred procedure is to add the secondary emulsifiers after the heating period, before the terpolymer emulsion has cooled to room temperature. In any event, with or without the secondary emulsifiers, the resulting aqueous emulsion of terpolymer is mechanically stable and ready for shipment, use, or storage.

The rate of agitation of the reaction mixture bears on the final particle size of the terpolymer. The rate of agitation is set to yield an average particle size in the range from about 0.1 to 0.2 micron, with a preferred range from about 0.12 to 0.17 micron for best mechanical stability of the aqueous emulsion and gloss-producing ability of the terpolymer when used in a paper coating composition. The preferred rate of stirring with an impeller type of agitator is about 260 to 350 r.p.m., but the rate may change as reaction vessel and stirrer sizes change.

The reaction and addition catalysts can be any of the various water-soluble per compounds known in the art, for example, hydrogen peroxide in its free state as a solution in water or in a dry state bound to an inorganic salt, such as the perborates, or bound to organic materials, such as urea, or other free-radical generating reagents such as persulfates, percarbonates, and persilicates. The preferred reaction catalysts are potassium persulfate and ammonium persulfate. The preferred addition catalyst, when used, is t-butyl hydroperoxide, but others may be used. The amount of reaction catalyst used usually varies between about 0.1 and 1.0% by weight of the total content of monomers, and the amount of addition catalyst, when used, varies between about 0.05 and 0.5% on the same weight basis.

The stability of the terpolymer emulsion, in the absence of conventional protective colloids, is believed to be due to the use of bulky emulsifiers which perform as emulsifiers and as chemical and mechanical stabilizers for the emulsion. Preferably, the total amount of primary and secondary emulsifiers do not exceed about 5.8% by weight of the total weight of monomers.

Stable emulsions of the terpolymers have been prepared wherein the emulsion has a terpolymer to water ratio by weight ranging from about 35:65 to about 50:50.

DETAILED DESCRIPTION

The invention will be described in greater detail with the aid of the following examples, which are given in illustration of the invention but are not intended as limitations thereon. Where parts are mentioned, they are parts by weight unless otherwise specified.

EXAMPLE 1

A stable aqueous emulsion of a terpolymer was prepared according to the following formulation:

| | Parts |
|---|---|
| Styrene | 648 |
| Acrylonitrile | 144 |
| Acrylamide | 8 |
| Potassium persulfate | 3.2 |
| t-butyl hydroperoxide | 0.5 |
| Primary emulsifiers: | |
|    Sodium dodecyl benzene sulfonate | 14 |
|    Octyl phenoxy ethanol (40 polyoxyethylene units) | 10 |
| Secondary emulsifiers: | |
|    Sodium octyl benzylpolyoxyethylene sulfonate | 6.4 |
|    Octyl phenoxy ethanol (40 polyoxyethylene units) | 13.6 |
| Water | 1000 |

A reaction vessel was charged with the water and 0.4 part of sodium bisulfite, the vessel was purged with nitrogen and sealed, and the temperature of the water was raised to about 67.5° C. Constant agitation with an impeller type of stirrer driven at about 300 r.p.m. was maintained throughout the complete process described below. The styrene, acrylonitrile, and acrylamide monomers, previously mixed together, were then added to the reaction vessel over a period of about 90 minutes. This time normally varies between about 1 and 2 hours. Simultaneously, with the addition of the monomers, the primary emulsifiers and potassium persulfate, previously dissolved together in sufficient water to make a total of about 190 parts solution, were added to the reaction vessel at a rate of about 1 part, by volume, to 5 parts of the mixture of monomers. The temperature throughout these additions was maintained between about 65° to 70° C. When the additions of monomers, primary emulsifiers, and reaction catalyst were completed, the addition catalyst, t-butyl hydroperoxide, was added and the temperature of the reaction mixture was raised to about 85° C. and maintained for about 1 hour. After cooling the reaction mixture to about 50° C., the secondary emulsifiers were added and agitation continued for about 15 minutes, after which the reaction products were cooled to room temperature.

Analysis of the resulting aqueous emulsion of the syrene-acrylonitrile-acrylamide terpolymer showed that all of the monomers had been reacted. The terpolymer comprised, by weight, about 81% styrene, about 18% acrylonitrile, and about 1% acrylamide. The pH of the emulsion was about 3.0, and the solids content was about 42%.

The emulsion exhibited excellent mechanical, chemical, and freeze-thaw stability. In runs similar to the above, but without the addition of the secondary emulsifiers, the resulting emulsions still exhibited excellent mechanical stability, being able to withstand vigorous agitation (12,000 r.p.m.) for more than 30 minutes before the breakdown of the emulsions.

EXAMPLES 2 AND 3

The process described in Example 1 was repeated except that in Example 2 acrylic acid was substituted for acrylamide, and in Example 3 methacrylic acid was substituted for acrylamide. The substitutions were on a direct basis by weight. In each case, stable aqueous emulsions of a terpolymer were prepared. In Example 2, the terpolymer comprised, by weight, about 81% styrene, about 18% acrylonitrile, and about 1% acrylic acid. In Example 3, the composition of the terpolymer was similar except that it comprised about 1% methacrylic acid in place of the acrylic acid.

EXAMPLE 4

Example 1 was repeated, except that the parts of the monomers used were as follows: styrene, 696 parts; acrylonitrile, 96 parts; and acrylamide, 8 parts. The resulting stable emulsion contained a terpolymer comprising by weight about 87% styrene, about 12% acrylonitrile, and about 1% acrylamide.

EXAMPLE 5

Example 3 was repeated, except that the parts of the monomers used were as follows: styrene, 600 parts; acrylonitrile, 160 parts; and methacrylic acid, 40 parts. The resulting stable emulsion contained a terpolymer comprising, by weight, about 75% styrene, about 20% acrylonitrile, and about 5% methacrylic acid.

In the above examples, the average particle diameters of the terpolymers in the emulsions ranged from about 0.1 to 0.2 micron. The preferred particle size range for a terpolymer destined for use as a pigment in a paper coating composition has been found to be about 0.12 to 0.17 micron.

EXAMPLE 6

A coating composition for paper was prepared by dispersing in water about 25 parts butadiene-styrene latex and about 239 parts of the terpolymer emulsion from Example 1 (pH adjusted to about 8.0 with ammonium hydroxide), to give a coating composition having a solids content of about 40%, all parts being by weight. On a dry basis, the coating composition contained about 10 parts of the terpolymer prepared according to Example 1. The coating composition was applied to a traveling web of paper by a trailing blade coater to give a coat weight of about 6.4 pounds per 3000 sq. ft. of paper, and the web was dried. There were no runnability problems. After gloss-calendering, the resulting coated paper had a B & L gloss of about 75 and an LRL brightness of about 83.

In this example, the terpolymer was the only pigmentary component of the coating composition and functioned as a gloss-producing organic pigment. Subsequent examples will compare the gloss-producing ability of the terpolymer with a conventional homopolymer.

EXAMPLE 7

The terpolymers of this invention can be used with conventional paper coating pigments in coating compositions. For example, a coating composition for paperboard was prepared by dispersing in water about 100 parts coating clay, about 24 parts of the terpolymer emulsion from Example 1 (about 10 parts terpolymer, dry basis), and as binder about 15 parts polyvinyl acetate and 2 parts alpha protein, all parts being by weight, to give a coating composition having a solids content of about 60%. The coating composition was applied by a blade coater to a traveling web of 18 point paperboard to give a coat weight of about 7 pounds per 3300 sq. ft. of paperboard. After drying, the coated paperboard was gloss-calendered with one nip heated to about 325° F., the calender loading being about 250 p.l.i.

EXAMPLES 8–11

In the following examples, coating compositions similar to that described in Example 7 were prepared, except for the following changes: Example 8, the parts terpolymer, dry basis, were about 7.5; Example 9, the parts terpolymer, dry basis, were about 5; Example 10, the terpolymer was completely replaced by 10 parts, dry basis, of a commercially available polystyrene homopolymer; and in Example 11, the coating composition contained neither the novel terpolymer nor homopolymer. After the coating, drying, and calendering operations set forth above in connection with Example 7 were completed, the coated paperboards exhibited the following properties:

| Example | B & L gloss | LRL brightness | K & N ink holdout | Wax pick |
|---|---|---|---|---|
| 7 | 59.4 | 78.9 | 72.6 | 8 |
| 8 | 56.9 | 79.2 | 68.0 | 8 |
| 9 | 47.5 | 79.3 | 63.1 | 7 |
| 10 | 51.0 | 80.5 | 66.3 | 8 |
| 11 | 39.8 | 79.3 | 42.0 | 7 |

By comparing Examples 7 and 10, it can be seen that the new terpolymer performed much better than the homopolymer as a gloss-developing organic pigment, had significantly better ink holdout properties (after 15 minutes testing), and provided substantially equivalent brightness and wax pick.

EXAMPLES 12–13

The terpolymers of this invention perform well as pigments in coating compositions for paper. In Example 12, a coating composition was prepared by dispersing in water about 100 parts clay, about 5.5 parts of the terpolymer from Example 1 (dry basis), and as binder about 10 parts starch and 10 parts of a conventional styrene-butadiene latex, with parts by weight, to give a coating composition having a solids content of about 62%. The coating composition was applied by a blade coater to a traveling web of paper at a coat weight of about 10 pounds per 3000 sq. ft. of paper. After drying, the coated paper was supercalendered with four nips, the loading being about 180 p.l.i. at the bottom nip.

In Example 13, the above was repeated, except that a polystyrene homopolymer replaced, on an equal basis, the new terpolymer made according to Example 1. The properties of the coated papers were as follows:

| Example | B & L gloss | LRL brightness | K & N ink holdout | Wax pick |
|---|---|---|---|---|
| 12 | 67.7 | 79.3 | 22.1 | 7–8 |
| 13 | 64.4 | 79.0 | 23.1 | 8–9 |

From the above, it can be seen that stable aqueous emulsions of the novel terpolymers can be prepared, and the emulsions can be added directly to other paper coating ingredients to form coating compositions which yield improvements in gloss over the level provided by conventional binder latices and styrene homopolymer latices. As previously stated, the addition of secondary emulsifiers to the emulsions is preferred when the terpolymers are intended for use in paper coating compositions. This is done to prevent any tendency of the emulsion to gel in the presence of contaminants that might be present in the other coating components. However, the terpolymers of this invention find utility in other areas where there is no need for the secondary emulsifiers. Such would be the case when the terpolymers are used in floor polishes to replace the polystyrene emulsions conventionally used.

I claim:

1. A terpolymer comprising styrene, acrylonitrile and acrylamide, wherein the components of the terpolymer are present by weight according to the following: about 70 to 90% styrene, about 8 to 25% acrylonitrile, and about 0.5 to 5% acrylamide.

2. A terpolymer according to claim 1 wherein the terpolymer comprises about 81% styrene, about 18% acrylonitrile, and about 1% acrylamide.

References Cited

UNITED STATES PATENTS

| 2,772,252 | 11/1956 | Briskin et al. | 260—80.5 |
|---|---|---|---|
| 3,053,819 | 9/1962 | Carlin | 260—80.5 |

JOSEPH L. SCHOFER, Primary Examiner

S. M. LEVIN, Assistant Examiner

U.S. Cl. X.R.

260—29.6 TA, 80.8